United States Patent
Shenouda

(10) Patent No.: US 11,149,582 B2
(45) Date of Patent: Oct. 19, 2021

(54) HEALTH MONITORING FOR MULTI-CHANNEL PRESSURE TRANSDUCERS

(71) Applicant: PRATT & WHITNEY CANADA CORP., Longueuil (CA)

(72) Inventor: Antwan Shenouda, Mississauga (CA)

(73) Assignee: PRATT & WHITNEY CANADA CORP., Longueuil (CA)

(*) Notice: Subject to any disclaimer, the term of this patent is extended or adjusted under 35 U.S.C. 154(b) by 75 days.

(21) Appl. No.: 16/654,233

(22) Filed: Oct. 16, 2019

(65) Prior Publication Data

US 2021/0115808 A1    Apr. 22, 2021

(51) Int. Cl.
  *F01D 21/00*    (2006.01)
  *G01L 27/00*    (2006.01)

(52) U.S. Cl.
  CPC ........ *F01D 21/003* (2013.01); *F05D 2220/32* (2013.01); *F05D 2260/80* (2013.01); *F05D 2260/821* (2013.01); *G01L 27/007* (2013.01)

(58) Field of Classification Search
  CPC ............... F01D 21/003; F05D 2260/80; F05D 2260/821; F05D 2270/44; G01L 27/00; G01L 27/007; G05B 23/0237
  See application file for complete search history.

(56) References Cited

U.S. PATENT DOCUMENTS

| | | | |
|---|---|---|---|
| 5,760,310 A * | 6/1998 | Rud, Jr. | G01L 19/0092 73/40 |
| 6,993,419 B2 | 1/2006 | D'Ouince et al. | |
| 7,082,758 B2 * | 8/2006 | Kageyama | E02F 9/20 60/329 |
| 7,203,594 B2 * | 4/2007 | Hasegawa | F02D 41/222 701/114 |
| 7,413,547 B1 | 8/2008 | Lichtscheidl et al. | |
| 7,855,562 B2 * | 12/2010 | Chiaburu | G01L 27/007 324/537 |
| 9,182,310 B2 | 11/2015 | Gaully et al. | |
| 9,417,150 B2 * | 8/2016 | Volonterio | G01L 19/02 |
| 10,055,905 B2 | 8/2018 | McConkey | |
| 10,106,263 B2 | 10/2018 | Horner | |
| 10,132,192 B2 * | 11/2018 | Scothern | G01K 15/007 |
| 10,239,640 B2 | 3/2019 | Ethington et al. | |
| 2002/0103584 A1 * | 8/2002 | Babala | G01L 15/00 701/29.2 |
| 2005/0262838 A1 * | 12/2005 | Kageyama | E02F 9/226 60/453 |
| 2006/0184309 A1 * | 8/2006 | Hasegawa | F02D 41/222 701/114 |

(Continued)

*Primary Examiner* — Igor Kershteyn
*Assistant Examiner* — Topaz L. Elliott
(74) *Attorney, Agent, or Firm* — Norton Rose Fulbright Canada LLP

(57) ABSTRACT

Methods and Systems for health-monitoring of a multi-channel pressure transducer of a gas turbine engine are described. The method comprises monitoring a deviation between a first channel and a second channel of a multi-channel pressure transducer over time, determining a rate of change of the deviation, extrapolating a trend over time based on the rate of change of the deviation to predict when the deviation will reach a threshold, and triggering a maintenance action for the pressure transducer based on the trend.

20 Claims, 5 Drawing Sheets

(56) References Cited

U.S. PATENT DOCUMENTS

| | | | |
|---|---|---|---|
| 2012/0197553 A1* | 8/2012 | Volonterio | G01L 19/02 |
| | | | 702/50 |
| 2013/0226492 A1* | 8/2013 | Moiseev | G05B 23/024 |
| | | | 702/85 |
| 2016/0061684 A1* | 3/2016 | Gehm | G05B 15/02 |
| | | | 701/36 |
| 2017/0167939 A1 | 6/2017 | Kastelein et al. | |
| 2017/0307460 A1 | 10/2017 | Ricci et al. | |
| 2018/0016935 A1* | 1/2018 | Scothern | G01K 13/02 |
| 2018/0292281 A1* | 10/2018 | Bailly | G01L 9/0052 |
| 2018/0362190 A1* | 12/2018 | Chambers | B64D 45/00 |
| 2018/0370651 A1* | 12/2018 | Miller | B64D 27/24 |
| 2019/0276154 A1* | 9/2019 | Horner | G01L 27/002 |

\* cited by examiner

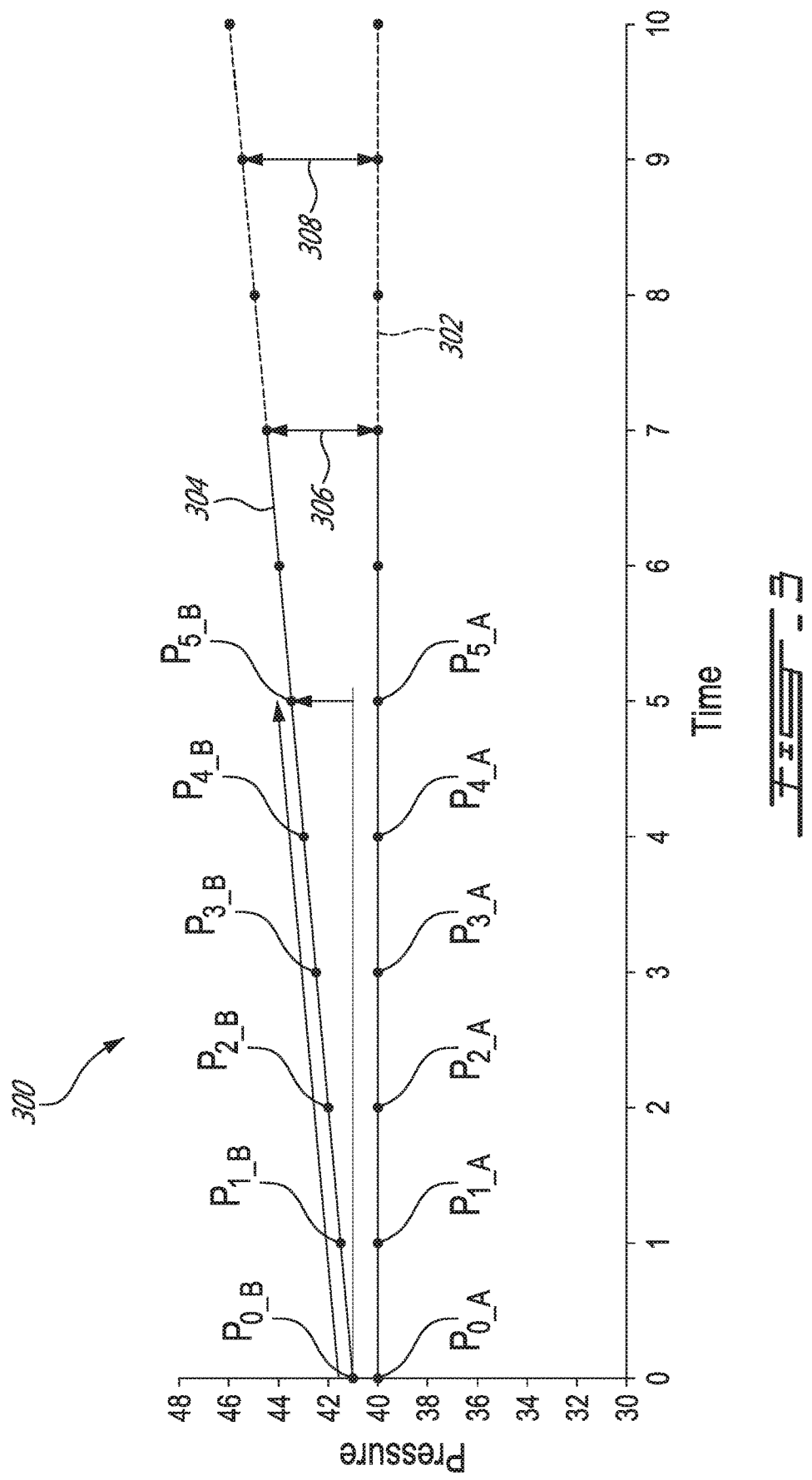

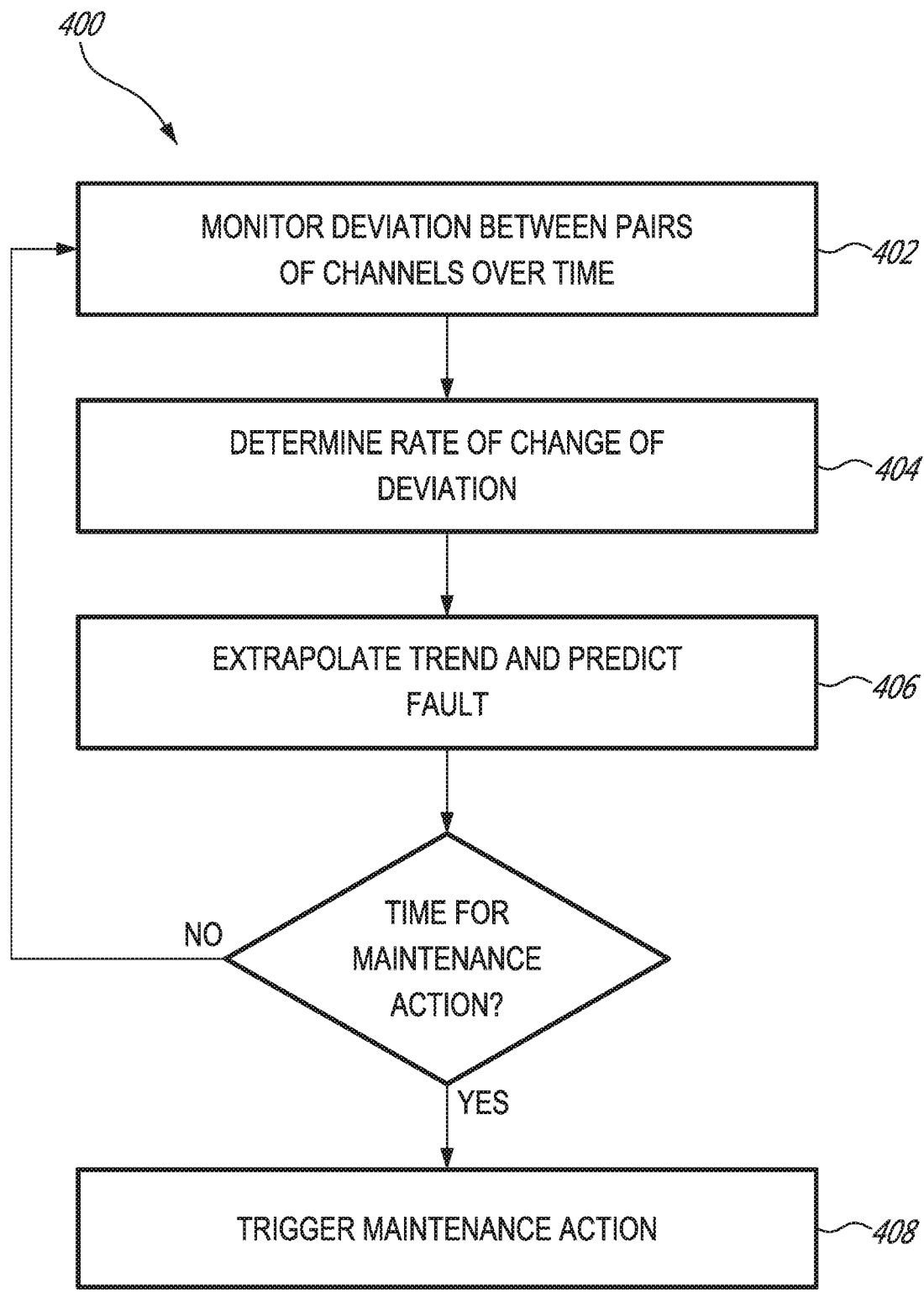

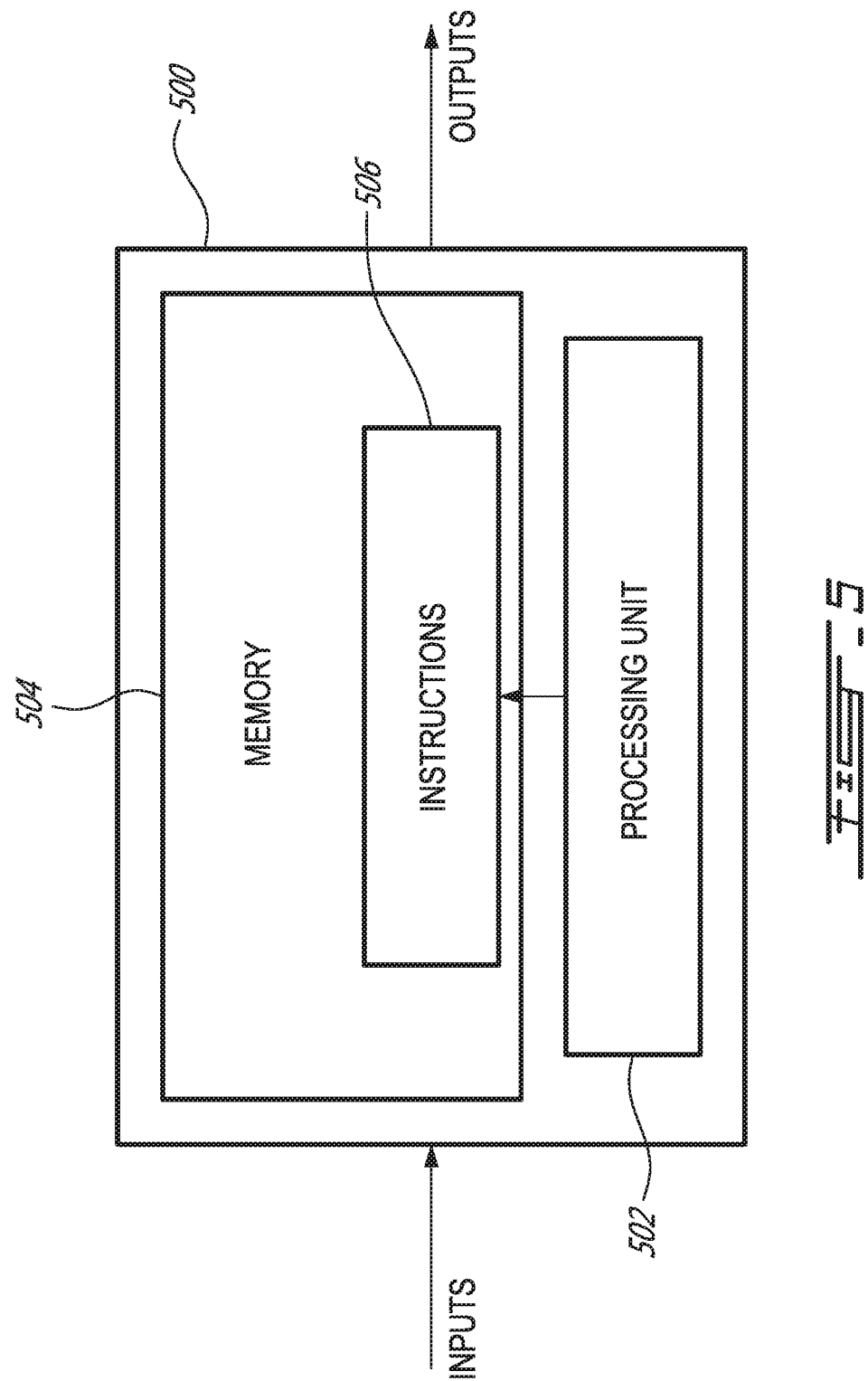

_US 11,149,582 B2_

HEALTH MONITORING FOR MULTI-CHANNEL PRESSURE TRANSDUCERS

TECHNICAL FIELD

The present disclosure relates generally to pressure transducers, and more particularly to health monitoring of multi-channel pressure transducers.

BACKGROUND OF THE ART

Pressure transducer measurements of gas turbine engine parameters are used for many important and sometimes safety critical functions in aircraft, such as shaft torque measurement and burner pressure monitoring. Downtime experienced due to a malfunctioning pressure transducer can have an impact on the operation of the aircraft. When a pressure transducer suddenly stops working, this may cause unscheduled maintenance events and require that an aircraft be kept on the ground.

Therefore, improvements are needed.

SUMMARY

In accordance with a broad aspect, there is provided a health monitoring method for a multi-channel pressure transducer of a gas turbine engine. The method comprises monitoring a deviation between a first channel and a second channel of a multi-channel pressure transducer over time, determining a rate of change of the deviation, extrapolating a trend over time based on the rate of change of the deviation to predict when the deviation will reach a threshold, and triggering a maintenance action for the pressure transducer based on the trend.

In accordance with another broad aspect, there is provided a health monitoring system for a pressure transducer of a gas turbine engine. The system comprises a processing unit and a non-transitory computer readable medium having stored thereon program instructions. The program instructions are executable by the processing unit for monitoring a deviation between a first channel and a second channel of a multi-channel pressure transducer over time, determining a rate of change of the deviation, extrapolating a trend over time based on the rate of change of the deviation to predict when the deviation will reach a threshold, and triggering a maintenance action for the pressure transducer based on the trend.

In accordance with yet another broad aspect, there is provided a system comprising a gas turbine engine, at least one multi-channel pressure transducer coupled to the gas turbine engine for measuring pressure along a gas path thereof, and a controller coupled to the at least one multi-channel pressure transducer. The controller is configured for monitoring a deviation between a first channel and a second channel of the pressure transducer over time, determining a rate of change of the deviation, extrapolating a trend over time based on the rate of change of the deviation to predict when the deviation will reach a threshold, and triggering a maintenance action for the pressure transducer based on the trend.

Features of the systems, devices, and methods described herein may be used in various combinations, in accordance with the embodiments described herein.

BRIEF DESCRIPTION OF THE DRAWINGS

Reference is now made to the accompanying figures in which:

FIG. 3 is a graph illustrating a deviation over time of pressure measurements between two channels of a pressure transducer, in accordance with one or more embodiments;

FIG. 4 is a flowchart of a method for health-monitoring of a multi-channel pressure transducer, in accordance with one or more embodiments; and FIG. 5 is a block diagram of a computing device for implementing the controller of FIG. 2, in accordance with one or more embodiments.

It will be noted that throughout the appended drawings, like features are identified by like reference numerals.

DETAILED DESCRIPTION

Figure 1:
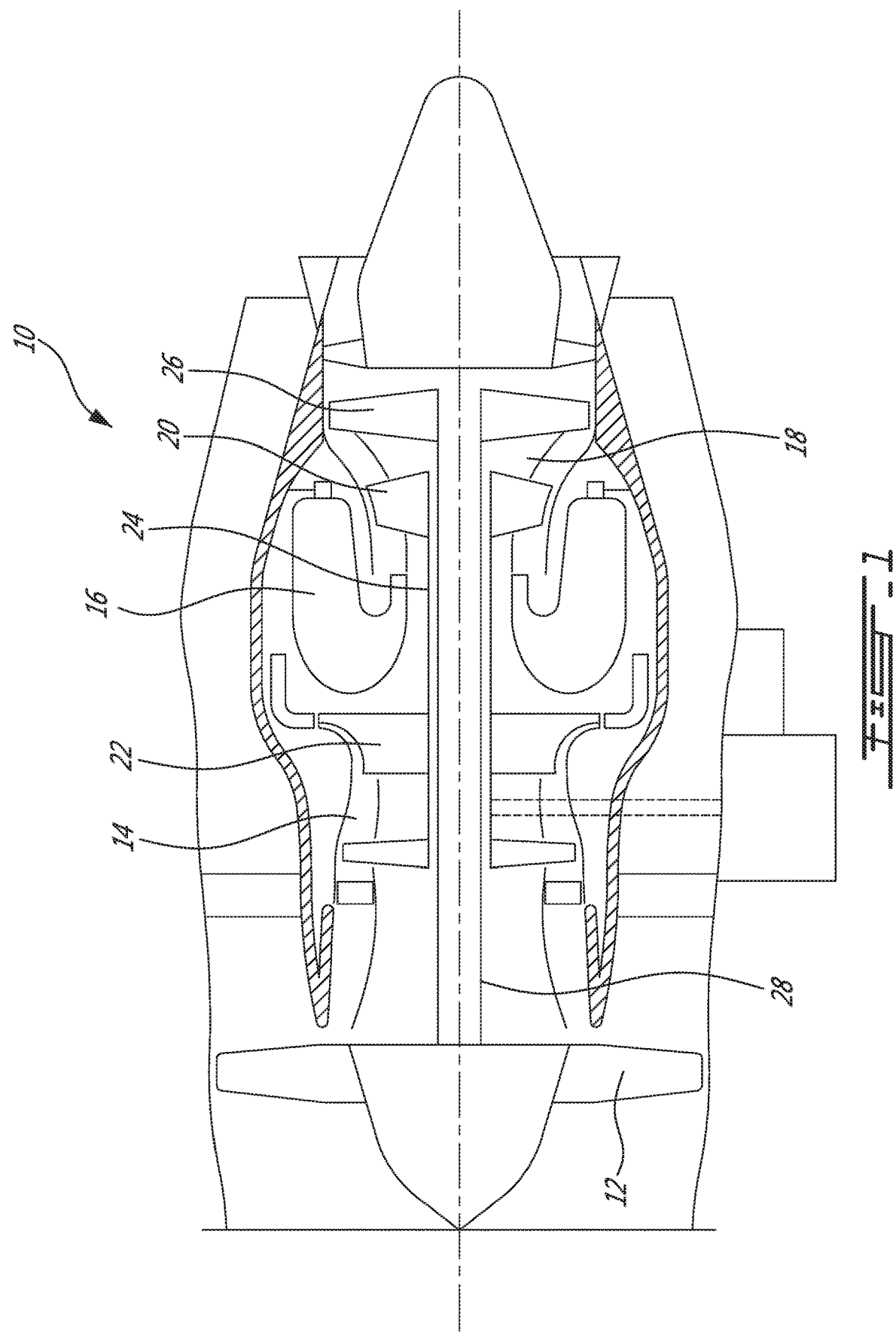
FIG. 1 is a schematic cross-sectional view of a gas turbine engine, in accordance with one or more embodiments.

FIG. 1 illustrates a gas turbine engine 10 of a type provided for use in subsonic flight, generally comprising in serial flow communication a fan 12 through which ambient air is propelled, a compressor section 14 for pressurizing the air, a combustor 16 in which the compressed air is mixed with fuel and ignited for generating an annular stream of hot combustion gases, and a turbine section 18 for extracting energy from the combustion gases. High pressure rotor(s) 20 of the turbine section 18 are drivingly engaged to high pressure rotor(s) 22 of the compressor section 14 through a high pressure shaft 24. Low pressure rotor(s) 26 of the turbine section 18 are drivingly engaged to the fan rotor 12 and to low pressure rotor(s) 30 of the compressor section 14 through a low pressure shaft 28 extending within the high pressure shaft 24 and rotating independently therefrom.

Although illustrated as a turbofan engine, the gas turbine engine 10 may alternatively be another type of engine, for example a turboshaft engine, also generally comprising in serial flow communication a compressor section, a combustor, and a turbine section, and an output shaft through which power is transferred. A turboprop engine may also apply. In addition, although the engine 10 is described herein for flight applications, it should be understood that other uses, such as industrial or the like, may apply.

As air passes through the engine 10, it undergoes numerous pressure and temperature changes along the way. The path along which air flows is referred to as the "gas path". There are numerous pressure measurement points for the airflow along the gas path. For example, pressure may be measured as air enters the engine 10 through the fan rotor 12, at an inlet of the compressor section 14, at an outlet of the compressor section 14, etc. Such measurements may be made with one or more pressure transducers.

Figure 2:
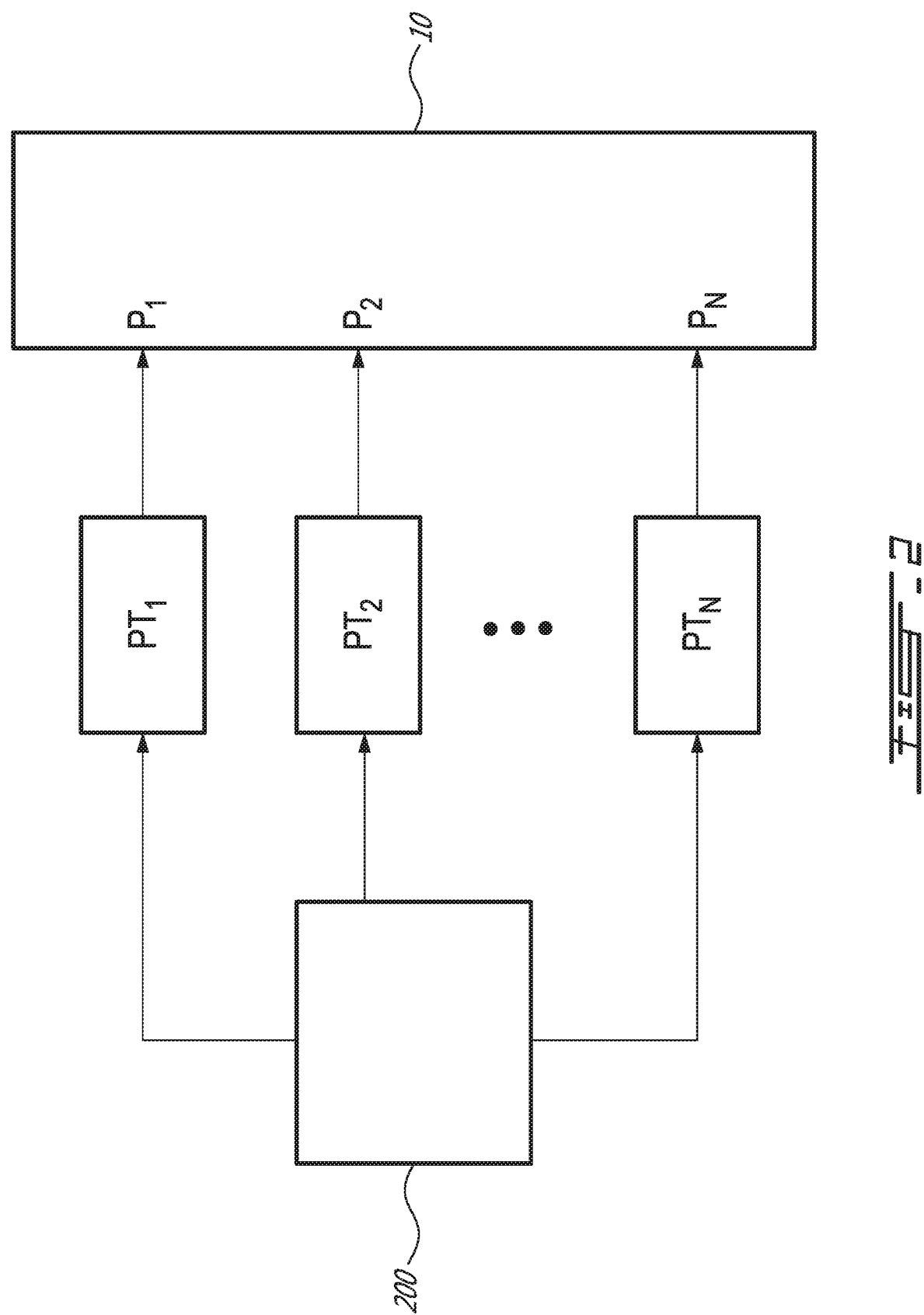
FIG. 2 is a block diagram of a health-monitoring setup, in accordance with one or more embodiments.

With reference to FIG. 2, a first pressure transducer $PT_1$ records a pressure measurement at position $P_1$ of the engine 10, a second pressure transducer $PT_2$ records a pressure measurement at position $P_2$ of the engine 10, and an Nth pressure transducer $PT_N$ records a pressure measurement at position $P_N$ of the engine 10. N may be any suitable integer corresponding to a number of pressure transducers provided for monitoring pressure of the engine 10. A controller 200 is configured for obtaining and recording the pressure measurements from the pressure transducers $PT_1$-$PT_N$.

A pressure transducer $PT_i$ (where i=1 to N) may be any pressure sensor for pressure measurement of gas or liquid capable of generating a signal as a function of the pressure imposed thereon. In some embodiments, the pressure transducer is used to indirectly measure a variable other than pressure, such as fluid flow, water level, and altitude. The pressure transducer $PT_i$ may be of various types, such as an absolute pressure sensor, a gauge pressure sensor, a vacuum pressure sensor, a differential pressure sensor, and a sealed pressure sensor. The pressure transducer $PT_i$ may operate on the basis of a variety of technologies, such as but not limited to piezoelectric, capacitive, electromagnetic, strain-gauge, optical, piezoresistive, and potentiometric.

Drift is the deviation of a signal reading from the pressure transducer, between a first instance in time and a subsequent instance in time, for the same pressure and temperature conditions. Drift rate is the rate of change of drift over time. In some embodiments, the pressure transducer $PT_i$ is multi-channel, having two or more channels that are electrically independent. For a multi-channel pressure transducer, drift may occur on two or more channels simultaneously, for example when the source of the drift is due to shared hardware between the two or more channels, such as a diaphragm. Drift may also occur on each channel independently if the source of the drift is unique to the channel.

In some embodiments, the controller 200 is configured for performing health monitoring of the multi-channel pressure transducer. Health-monitoring comprises detecting drift and predicting a maintenance action. Drift may be detected by monitoring a deviation over time between pairs of channels in a multi-channel pressure transducer having channel specific drift.

Referring to FIG. 3, there is illustrated a graph 300 showing an example for a dual-channel pressure transducer. In this example, curve 302 illustrates a stable measurement of pressure over time for channel A, and curve 304 illustrates a drifting measurement of pressure over time for channel B. As the pressure measurements of channel A drift over time, the difference, or deviation, between channel A and channel B increases. Alternatively, both channels A and B may be experiencing drift in opposite directions, also causing the difference between channels A and B to increase over time. Also alternatively, both channels A and B may be experiencing drift in a same direction at different rates, such that the difference between the two channels gradually increases over time.

The controller 200 monitors the deviation between pairs of channels by measuring and recording initial readings for channels A and B at a first instance in time. For example, $P_{0\_A}$ and $P_{0\_B}$ correspond to initial readings for channel A and channel B, respectively, at time T=0. In some embodiments, the initial readings are measured and recorded at a time of entry into service of the pressure transducer. Alternatively, any instance in time may serve as a reference point for initial readings. The controller 200 then measures and records subsequent readings for channels A and B at subsequent instances in time. For example, $P_{1\_A}$, $P_{2\_A}$, $P_{3\_A}$, $P_{4\_A}$, $P_{5\_A}$ are measured and recorded for channel A; $P_{1\_B}$, $P_{2\_B}$, $P_{3\_B}$, $P_{4\_B}$, $P_{5\_B}$ are measured and recorded for channel B, at times T=1, 2, 3, 4, 5 respectively. Note that in order to compare the initial readings for channel A and channel B, they are taken at a same temperature. Similarly, in order to compare the initial readings with any of the subsequent readings for a given channel, they are taken at a same temperature.

A difference between the readings of channel A and the readings of channel B at each instance in time corresponds to the deviation between channels A and B. For example, 306 is the deviation between channel A and channel B at time T=7. Note that if the initial readings at time T=0 are the same for channel A and channel B, and only channel B drifts, then the deviation between the two channels is equivalent to the drift of channel B. If the starting point for pressure is not the same between channel A and channel B, then the deviation between the two channels is not equivalent to the drift of channel B. However, the deviation between the two channels may be used to detect the drift of channel B and to determine a drift rate of channel B.

The controller 200 is configured to determine a rate of change of the deviation between channels A and B over time. The rate of change of the deviation is determined using any two points along the curve 304 and computing the slope. The rate of change may vary depending on which two points are selected. For example, the rate of change at time T=5, computed using $P_{1B}$ and $P_{5B}$, may be greater than or less than the rate of change at time T=3, computed using $P_{1B}$ and $P_{3B}$. The rate of change may be updated every time a new data point is obtained. In some embodiments, the rate of change is non-linear.

As more points are generated along curve 304, a trend may be extrapolated. In the case of a non-linear rate of change, the controller 200 may be configured to curve-fit the data to create a trend based on previous measurements. A prediction may be made based on the trend as to when the deviation between the channels will reach a deviation threshold. An example is illustrated in FIG. 3. Points along curves 302, 304 beyond time T=7 are estimated using the slope of the curve and the plurality of points measured and recorded over time prior to and until time T=7. Based on the trend, the deviation between channels A and B is expected to reach a threshold 308 at time T=9.

The controller 200 is configured to trigger a maintenance action for the multi-channel pressure transducer based on the trend and the prediction for reaching the threshold. This can give an aircraft operator and/or engine manufacturer an early warning about a potential fault occurrence. Instead of waiting until the threshold is reached to trigger the maintenance action, the maintenance action is triggered before the threshold is reached, as a function of when the threshold is expected to be reached. Triggering the maintenance action based on the prediction may prevent an aircraft on ground (AOG) scenario, whereby an aircraft unexpectedly gets grounded due to a sudden fault. Unscheduled maintenance events may also be avoided and/or prevented. For example, if a scheduled maintenance event is upcoming and the deviation threshold is expected to be reached before a next scheduled maintenance event, the pressure transducer may be changed at the upcoming scheduled maintenance event.

In some embodiments, triggering a maintenance action comprises sending an alert signal, either to a cockpit of an aircraft or to another system of the engine and/or aircraft. An alert signal may also be sent to a location remote to the aircraft. The alert signal is indicative of a need for a maintenance action. For example, the alert signal may cause a visual and/or audio indicator in the cockpit to turn on. The alert signal may cause a text message to scroll across a screen in the cockpit. In some embodiments, triggering the maintenance action comprises setting a maintenance flag associated with the engine.

In some embodiments, the multi-channel pressure transducer comprises three or more channels, and monitoring the deviation comprises performing channel to channel comparisons between channel pairs. For example, for a multi-channel pressure transducer having channels A, B, and C, a deviation may be monitored between channels A and B, channels B and C, and channels A and C. Each channel pair may have an associated rate of change for the deviations measured at the different instances in time. Each channel pair may have an associated prediction for when the deviation will reach a deviation threshold, based on a trend extrapolated over time for each pair. An example is illustrated in Table 1, for given temperature and pressure conditions.

TABLE 1

| CHANNEL PAIR | DEVIATIONS (DISTANCE BETWEEN DATA POINTS) | RATE OF CHANGE | PREDICTED FAULT |
|---|---|---|---|
| CH A & B | $D_{A\&B\_1}$, $D_{A\&B\_2}$, $D_{A\&B\_3}$, ... | $R_{A\&B}$ | $T_{A\&B}$ |
| CH A & C | $D_{A\&C\_1}$, $D_{A\&C\_2}$, $D_{A\&C\_3}$, ... | $R_{A\&C}$ | $T_{A\&C}$ |
| CH B & C | $D_{B\&C\_1}$, $D_{B\&C\_2}$, $D_{B\&C\_3}$, ... | $R_{B\&C}$ | $T_{B\&C}$ |

In the example of Table 1, a maintenance action may be triggered based on the earliest one of $T=T_{A\&B}$, $T_{A\&C}$, $T_{B\&C}$. The rate of change for each channel may be updated whenever a new data point is obtained, thus allowing the trend to be updated and the time for the predicted fault to be updated. If one of the channels is stable (i.e. no drift) compared to the other two channels, the comparison may be performed only between the stable channel and each one of the drifting channels.

In some embodiments, the deviation between pairs of channels is measured at two or more different engine operating points. This is to capture scenarios where different temperature and pressure conditions cause different drifts on the pressure transducer. Each engine operating point may correspond to a given set of pressure and temperature conditions. For each channel pair, a deviation is monitored over time at each one of the engine operating points. An example is illustrated in Table 2.

TABLE 2

| CHANNEL PAIR A&B | | | |
|---|---|---|---|
| ENGINE OPERATING POINT | DEVIATIONS (DISTANCE BETWEEN DATA POINTS) | RATE OF CHANGE | PREDICTED FAULT |
| $PRES_1$, $TEMP_1$ | $D_{A\&B\_1\_1}$, $D_{A\&B\_1\_2}$, $D_{A\&B\_1\_3}$, ... | $R_{A\&B\_1}$ | $T_{A\&B\_1}$ |
| $PRES_2$, $TEMP_2$ | $D_{A\&B\_2\_1}$, $D_{A\&B\_2\_2}$, $D_{A\&B\_2\_3}$, ... | $R_{A\&B\_2}$ | $T_{A\&B\_2}$ |
| $PRES_3$, $TEMP_3$ | $D_{A\&B\_3\_1}$, $D_{A\&B\_3\_2}$, $D_{A\&B\_3\_3}$, ... | $R_{A\&B\_3}$ | $T_{A\&B\_3}$ |
| CHANNEL PAIR A&C | | | |
| ENGINE OPERATING POINT | DEVIATIONS | RATE OF CHANGE | PREDICTED FAULT |
| $PRES_1$, $TEMP_1$ | $D_{A\&C\_1\_1}$, $D_{A\&C\_1\_2}$, $D_{A\&C\_1\_3}$, ... | $R_{A\&C\_1}$ | $T_{A\&C\_1}$ |
| $PRES_2$, $TEMP_2$ | $D_{A\&C\_2\_1}$, $D_{A\&C\_2\_2}$, $D_{A\&C\_2\_3}$, ... | $R_{A\&C\_1}$ | $T_{A\&C\_2}$ |
| $PRES_3$, $TEMP_3$ | $D_{A\&C\_3\_1}$, $D_{A\&C\_3\_2}$, $D_{A\&C\_3\_3}$, ... | $R_{A\&C\_1}$ | $T_{A\&C\_3}$ |

In the example of Table 2, a rate of change for the deviation is determined for each engine operating point, for each channel pair. A corresponding prediction is made for each engine operating point, for each channel pair. A maintenance action may be triggered based on the earliest one of $T=T_{A\&B\_1}$, $T_{A\&B\_2}$, $T_{A\&B\_3}$, $T_{A\&C\_1}$, $T_{A\&C\_2}$, $T_{A\&C\_3}$.

In some embodiments, the different operating points at which pressure measurements are obtained comprise an operating point when the engine is off, an operating point after the engine is started, and an operating point after the engine is shut-down. More than one operating point may be used after the engine is started and before it is shutdown. A time delay may be used to allow the engine to stabilize at each one of the operating points before a measurement is taken. Alternatively or in combination therewith, certain engine parameters may be monitored to determine that the engine is stable at the given operating point before the measurements are taken.

With reference to FIG. 4, there is illustrated an example of a method 400 for health-monitoring of a multi-channel pressure transducer. At step 402, the deviation between pairs of channels is monitored over time, at a first engine operating point. As stated above, the deviation may be monitored for multiple pairs of channels, each pair having its own deviation monitored independently. The deviation may be monitored at multiple engine operating points, each engine operating point having its own deviation monitored independently.

At step 404, a rate of change of the deviation between the pairs of channels is determined. The rate of change may be determined for each pair of channels monitored, and for each engine operating point. For example, a multi-channel pressure transducer having 3 channel pairs being monitored and 2 operating points per channel pair monitored might monitor 6 different deviations over time, two per channel pair, and thus determine 6 different rates of change. Each new data point obtained over time may be used to update the rate of change of the deviation.

At step 406, a trend is extrapolated for each channel pair monitored over time, and a time is predicted for a fault in the pressure transducer, the fault occurring when the deviation between the channel pair is expected to reach a deviation threshold. A maintenance action is triggered based on the prediction at step 408. Steps 402-406 may be performed iteratively until the predicted time is less than a given time period away. Each iteration of steps 402-406 may be used to add new data points, thus allowing the rate of change of the deviation to be updated and the accuracy of the prediction for fault occurrence to be improved. The given time period used to trigger the maintenance action may be set using various parameters. For example, it may be the duration of a longest mission for the aircraft. It may be determined using the time between scheduled maintenance events or using the time until a next scheduled event. Other implementations may also apply.

With reference to FIG. 5, an example of a computing device 500 is illustrated. The controller 200 may be implemented with one or more computing devices 500. Note that the controller 200 can be implemented as part of a full-authority digital engine controls (FADEC) or other similar device, including electronic engine control (EEC), engine control unit (ECU), electronic propeller control, propeller control unit, and the like. In some embodiments, the controller 200 is implemented as a Flight Data Acquisition Storage and Transmission system, such as a FAST™ system. The controller 200 may be implemented in part in the FAST™ system and in part in the EEC. Other embodiments may also apply.

The computing device 500 comprises a processing unit 502 and a memory 504 which has stored therein computer-executable instructions 506. The processing unit 502 may comprise any suitable devices configured to implement the method 400 such that instructions 506, when executed by the computing device 500 or other programmable apparatus, may cause the functions/acts/steps performed as part of the method 400 as described herein to be executed. The processing unit 502 may comprise, for example, any type of general-purpose microprocessor or microcontroller, a digital signal processing (DSP) processor, a central processing unit (CPU), an integrated circuit, a field programmable gate array (FPGA), a reconfigurable processor, other suitably programmed or programmable logic circuits, or any combination thereof.

The memory 504 may comprise any suitable known or other machine-readable storage medium. The memory 504 may comprise non-transitory computer readable storage medium, for example, but not limited to, an electronic, magnetic, optical, electromagnetic, infrared, or semiconductor system, apparatus, or device, or any suitable combination of the foregoing. The memory 504 may include a suitable combination of any type of computer memory that is located either internally or externally to device, for example random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like. Memory 504 may comprise any storage means (e.g., devices) suitable for retrievably storing machine-readable instructions 506 executable by processing unit 502.

The methods and systems for pressure transducer health-monitoring described herein may be implemented in a high level procedural or object oriented programming or scripting language, or a combination thereof, to communicate with or assist in the operation of a computer system, for example the computing device 500. Alternatively, the methods and systems for pressure transducer health-monitoring may be implemented in assembly or machine language. The language may be a compiled or interpreted language. Program code for implementing the methods and systems for pressure transducer health-monitoring may be stored on a storage media or a device, for example a ROM, a magnetic disk, an optical disc, a flash drive, or any other suitable storage media or device. The program code may be readable by a general or special-purpose programmable computer for configuring and operating the computer when the storage media or device is read by the computer to perform the procedures described herein. Embodiments of the methods and systems for pressure transducer health-monitoring may also be considered to be implemented by way of a non-transitory computer-readable storage medium having a computer program stored thereon. The computer program may comprise computer-readable instructions which cause a computer, or more specifically the processing unit 502 of the computing device 500, to operate in a specific and predefined manner to perform the functions described herein, for example those described in the method 400.

Computer-executable instructions may be in many forms, including program modules, executed by one or more computers or other devices. Generally, program modules include routines, programs, objects, components, data structures, etc., that perform particular tasks or implement particular abstract data types. Typically the functionality of the program modules may be combined or distributed as desired in various embodiments.

The above description is meant to be exemplary only, and one skilled in the art will recognize that changes may be made to the embodiments described without departing from the scope of the invention disclosed. Still other modifications which fall within the scope of the present invention will be apparent to those skilled in the art, in light of a review of this disclosure.

Various aspects of the methods and systems for pressure transducer health-monitoring may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments. Although particular embodiments have been shown and described, it will be obvious to those skilled in the art that changes and modifications may be made without departing from this invention in its broader aspects. The scope of the following claims should not be limited by the embodiments set forth in the examples, but should be given the broadest reasonable interpretation consistent with the description as a whole.

The invention claimed is:

1. A health monitoring method for a multi-channel pressure transducer of a gas turbine engine, the method comprising
monitoring a deviation between a first channel and a second channel of a multi-channel pressure transducer over time;
determining a rate of change of the deviation;
extrapolating a trend over time based on the rate of change of the deviation to predict when the deviation will reach a threshold; and
triggering a maintenance action for the multi-channel pressure transducer based on the trend.

2. The method of claim 1, wherein the multi-channel pressure transducer comprises at least three channels, and monitoring the deviation comprises doing channel to channel comparisons between channel pairs.

3. The method of claim 2, wherein determining the rate of change of the deviation comprises determining the rate of change for each of the channel pairs, and wherein extrapolating the trend comprises extrapolating the trend for each of the channel pairs.

4. The method of claim 1, wherein the first channel drifts over time and the second channel is stable.

5. The method of claim 1, wherein monitoring the deviation comprises:
measuring and recording pressure readings for the first channel and the second channel at a plurality of instances in time at first pressure and temperature conditions; and
determining a difference between the pressure readings of the first channel and the second channel at the plurality of instances in time, the difference corresponding to the deviation.

6. The method of claim 5, wherein monitoring the deviation comprises monitoring the deviation for a plurality of pressure and temperature conditions.

7. The method of claim 6, wherein determining the rate of change of the deviation comprises determining the rate of change of the deviation for the plurality of pressure and temperature conditions.

8. The method of claim 7, wherein extrapolating the trend over time comprises extrapolating the trend for the plurality of pressure and temperature conditions, and predicting when the deviation will reach the threshold at any one of the pressure and temperature conditions.

9. The method of claim 6, wherein the plurality of pressure and temperature conditions comprise an engine operating point prior to an engine start, at least one engine operating point after the engine start, and an engine operating point following engine shutdown.

10. A health monitoring system for a multi-channel pressure transducer of a gas turbine engine, the system comprising:
   a processing unit; and
   a non-transitory computer readable medium having stored thereon program instructions executable by the processing unit for:
      monitoring a deviation between a first channel and a second channel of a multi-channel pressure transducer over time;
      determining a rate of change of the deviation;
      extrapolating a trend over time based on the rate of change of the deviation to predict when the deviation will reach a threshold; and
      triggering a maintenance action for the multi-channel pressure transducer based on the trend.

11. The system of claim 10, wherein the multi-channel pressure transducer comprises at least three channels, and monitoring the deviation comprises doing channel to channel comparisons between channel pairs.

12. The system of claim 11, wherein determining the rate of change of the deviation comprises determining the rate of change for each of the channel pairs, and wherein extrapolating the trend comprises extrapolating the trend for each of the channel pairs.

13. The system of claim 10, wherein the first channel drifts over time and the second channel is stable.

14. The system of claim 10, wherein monitoring the deviation comprises:
   measuring and recording pressure readings for the first channel and the second channel at a plurality of instances in time at first pressure and temperature conditions; and
   determining a difference between the pressure readings of the first channel and the second channel at the plurality of instances in time, the difference corresponding to the deviation.

15. The system of claim 14, wherein monitoring the deviation comprises monitoring the deviation for a plurality of pressure and temperature conditions.

16. The system of claim 15, wherein determining the rate of change of the deviation comprises determining the rate of change of the deviation for the plurality of pressure and temperature conditions.

17. The system of claim 16, wherein extrapolating the trend over time comprises extrapolating the trend for the plurality of pressure and temperature conditions, and predicting when the deviation will reach the threshold at any one of the pressure and temperature conditions.

18. The system of claim 17, wherein the plurality of pressure and temperature conditions comprise an engine operating point prior to an engine start, at least one engine operating point after the engine start, and an engine operating point following engine shutdown.

19. A system comprising:
   a gas turbine engine;
   at least one multi-channel pressure transducer coupled to the gas turbine engine for measuring pressure along a gas path thereof; and
   a controller coupled to the at least one multi-channel pressure transducer and configured for:
      monitoring a deviation between a first channel and a second channel of the at least one multi-channel pressure transducer over time;
      determining a rate of change of the deviation;
      extrapolating a trend over time based on the rate of change of the deviation to predict when the deviation will reach a threshold; and
      triggering a maintenance action for the at least one multi-channel pressure transducer based on the trend.

20. The system of claim 19, wherein the first channel drifts over time and the second channel is stable.

* * * * *